United States Patent
Toth et al.

(10) Patent No.: US 11,716,372 B2
(45) Date of Patent: Aug. 1, 2023

(54) METHOD AND SYSTEM FOR CENTRALIZED MANAGEMENT OF ACCESS SUBNETWORK SELECTION FOR MOBILE PLATFORM COMMUNICATIONS

(71) Applicant: Honeywell International Inc., Morris Plains, NJ (US)

(72) Inventors: Louis T. Toth, Baltimore, MD (US); Philip Hermann, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 210 days.

(21) Appl. No.: 15/930,126

(22) Filed: May 12, 2020

(65) Prior Publication Data
US 2021/0099550 A1 Apr. 1, 2021

Related U.S. Application Data

(60) Provisional application No. 62/908,888, filed on Oct. 1, 2019.

(51) Int. Cl.
*H04L 67/01* (2022.01)
*H04B 7/185* (2006.01)
(Continued)

(52) U.S. Cl.
CPC ......... *H04L 67/01* (2022.05); *H04B 7/18506* (2013.01); *H04L 67/12* (2013.01);
(Continued)

(58) Field of Classification Search
CPC ....... H04L 67/42; H04L 67/12; H04L 69/329; H04L 41/24; H04L 63/08; H04L 67/04;
(Continued)

(56) References Cited

U.S. PATENT DOCUMENTS 6,985,942 B2  1/2006 D'Annunzio et al.
7,817,667 B2  10/2010 Frederiksen et al.
(Continued)

FOREIGN PATENT DOCUMENTS

CN  102843444 A  12/2012
EP  3130117 A1  2/2017
(Continued)

OTHER PUBLICATIONS

Snively, Austin, "ATN Air/Ground Subnetwork Use", Oct. 1995, ATNP WG-2/WP-180 (Year: 1995).*

(Continued)

*Primary Examiner* — Ramy M Osman
(74) *Attorney, Agent, or Firm* — Fogg & Powers LLC

(57) ABSTRACT

A system for centralized management of access subnetwork selections is disclosed. The system comprises an Internet protocol-based communications management (ICM) client located on an onboard server of each of one or more vehicles, and an ICM server located at a ground center. The ICM server is in operative communication with the ICM client on each of the one or more vehicles. The ICM client on each of the one or more vehicles is operative to communicate with the ICM server through one or more subnetworks, which are in operative communication with a ground network. The ground network communicates with the ICM server.

20 Claims, 8 Drawing Sheets

(51) Int. Cl.
    *H04L 67/12* (2022.01)
    *H04L 69/329* (2022.01)
    *H04W 84/06* (2009.01)
    *H04W 88/06* (2009.01)
    *H04L 41/00* (2022.01)

(52) U.S. Cl.
    CPC ........... *H04L 69/329* (2013.01); *H04W 84/06* (2013.01); *H04W 88/06* (2013.01); *H04L 41/24* (2013.01)

(58) Field of Classification Search
    CPC . H04L 67/20; H04B 7/18506; H04B 7/18589; H04W 84/06; H04W 88/06; H04W 84/005; H04W 4/40
    See application file for complete search history.

(56) References Cited

U.S. PATENT DOCUMENTS

| | | |
|---|---|---|
| 8,081,969 B2 | 12/2011 | Lauer et al. |
| 8,121,593 B2 | 2/2012 | Pandit et al. |
| 8,190,727 B2 | 5/2012 | Henkel |
| 8,254,914 B2 | 8/2012 | Lauer et al. |
| 9,565,618 B1 | 2/2017 | Bantoft et al. |
| 9,596,142 B2 | 3/2017 | Claudel et al. |
| 10,200,111 B2 | 2/2019 | Lauer et al. |
| 10,225,349 B2* | 3/2019 | Dusik ............ H04L 67/12 |
| 10,425,149 B1 | 9/2019 | Judd et al. |
| 2008/0244266 A1* | 10/2008 | Cai ................ H04L 63/083 713/170 |
| 2009/0172801 A1* | 7/2009 | Friedrich .......... H04L 67/14 726/12 |
| 2010/0118771 A1* | 5/2010 | Lee .............. H04W 36/005 370/328 |
| 2011/0255506 A1* | 10/2011 | Toth .............. H04W 84/005 370/328 |
| 2012/0143405 A1* | 6/2012 | Cabos ............. G07C 5/008 701/3 |
| 2014/0003335 A1 | 1/2014 | Roy |
| 2014/0075506 A1* | 3/2014 | Davis ............. H04L 67/12 726/3 |
| 2016/0037434 A1* | 2/2016 | Gopal ............. H04B 7/1851 370/316 |
| 2017/0186328 A1* | 6/2017 | Beernaert .......... G08G 5/003 |
| 2017/0295154 A1 | 10/2017 | Jackson et al. |
| 2018/0225651 A1 | 8/2018 | Stone et al. |
| 2019/0090180 A1* | 3/2019 | Judd ............... H04W 48/18 |
| 2020/0407075 A1* | 12/2020 | Toews .............. H04L 67/12 |
| 2020/0412442 A1* | 12/2020 | Popelka ......... H04B 7/18528 |
| 2021/0099550 A1* | 4/2021 | Toth ............... H04L 67/12 |

FOREIGN PATENT DOCUMENTS

| | | |
|---|---|---|
| EP | 3130117 B1 | 8/2019 |
| WO | 2015154279 A1 | 10/2015 |

OTHER PUBLICATIONS

Xiaozhong He et al., "Data Transmission Protocol To Reduce Delay During Link Switchovers", U.S. Appl. No. 16/742,515, filed Jan. 14, 2020, pp. 1 through 24, Published: US.

European Patent Office, "Extended European Search Report from EP Application No. 20197618.0", from Foreign Counterpart to U.S. Appl. No. 15/930,126, filed Feb. 26, 2021, pp. 1 through 7, Published: EP.

European Patent Office, "Communication pursuant to Article 94(3) from EP Application No. 20197618.0 ", from Foreign Counterpart to U.S. Appl. No. 15/930,126, filed Jun. 10, 2022, pp. 1 through 5, Published: EP.

\* cited by examiner

METHOD AND SYSTEM FOR CENTRALIZED MANAGEMENT OF ACCESS SUBNETWORK SELECTION FOR MOBILE PLATFORM COMMUNICATIONS

CROSS REFERENCE TO RELATED APPLICATION

This application claims the benefit of priority to U.S. Provisional Application No. 62/908,888, filed on Oct. 1, 2019, which is herein incorporated by reference.

BACKGROUND

In aviation, data communications provide connectivity between aircraft and ground-based applications via Air/Ground (A/G) access subnetworks. Applications include Air Traffic Service (ATS), Aeronautical Operational Control (AOC), Aeronautical Administrative Communication (AAC), and Aeronautical Passenger Communication (APC). These applications have different quality of service needs, from low latency, high-throughput streaming for video and/or Voice over Internet Protocol (VoIP), to the less stringent needs of downlinking of maintenance information for logging purposes. Moreover, the quality of service capabilities inherent in the technologies used in the A/G access subnetworks differ. Also, during aircraft flight phases and as aircraft traverse across geographic regions, the availability and quality of service of A/G access subnetworks change due to geographical coverage limitations, quality fluctuations related to radio frequency physics, and regulatory restrictions such as aircraft altitude limits associated with the use of a communications type. In addition, airlines have preferences on what media and what service providers they want to use based on media capabilities and service level agreements the airlines have with service providers.

Policy-based management of aviation data communication systems uses policy-based rules in making real-time decisions during flight operations to select the appropriate A/G access subnetworks. Decision logic executing on-aircraft applies the rules and real-time inputs on current aircraft state, application needs, and A/G subnetwork conditions and availability, to select what A/G subnetworks to use and to connect the A/G data flows to the interfaces of the selected A/G radios. The decision logic may also control operation of the radios (e.g., power-up radio, change level of transmission power, establish/terminate links, etc.), depending on the management and control functions exposed by the radios. The decision logic, interfaces, services and interactions with the radios, applications, communications network stack components, and acquisition of aircraft state information from the sources, comprise the overall communications management function.

The communications management function on-aircraft (or on-device or in-vehicle, etc.) is implemented in software and/or firmware executing in equipment, onboard server(s), and/or embedded processor(s). The software/firmware requires processor resources, such as processor utilization, memory, and storage. Additionally, varying levels of certification for operational safety and security is required. This is achieved through a certification process associated with the related development, implementation, and/or installation processes. Also, during the life cycle of the equipment, the communications management function software/firmware requires upgrades and updates with new capabilities, fixes, and improved security.

The problems with placing a communications management function on every aircraft (or device, vehicle, or the like) include the use of limited processor resources, that could otherwise be used/reserved for existing and future customer applications; the cost of safety and security certification in the development/implementation phase of the life cycle, and thus extra cost to the user; and the cost and logistical complexity of software/firmware updates and upgrades during the life cycle, which impact user operations and increase costs.

SUMMARY

A system for centralized management of access subnetwork selections is disclosed. The system comprises an Internet protocol-based communications management (ICM) client located on an onboard server of each of one or more vehicles, and an ICM server located at a ground center. The ICM server is in operative communication with the ICM client on each of the one or more vehicles. The ICM client on each of the one or more vehicles is operative to communicate with the ICM server through one or more subnetworks, which are in operative communication with a ground network. The ground network communicates with the ICM server

DETAILED DESCRIPTION

Figure 1:
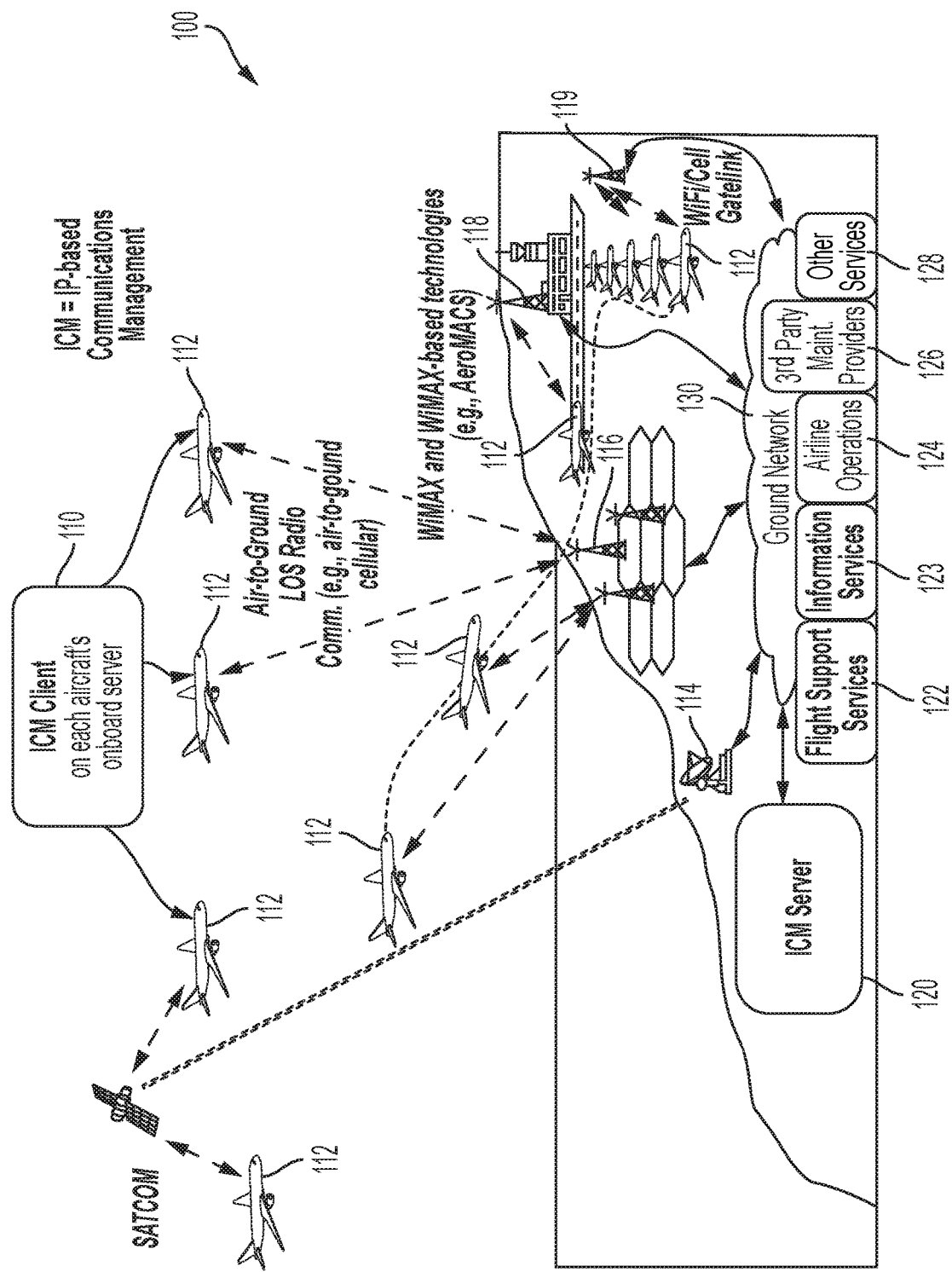
FIG. 1 is a schematic operational view of a system for centralized management of access subnetwork selections, according to one implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for centralized management of access subnetwork selections for mobile platform communications are described herein. The system and method for centralized management of access subnetwork selections allow for the above described problems to be mitigated by placing a communications management function in a centralized server to manage many platforms from the centralized server, thereby allowing for much smaller client software/firmware on each platform. In one example implementation, the centralized server can be a ground-based server in the aviation domain.

The communications management server and clients communicate to effect optimal computations management over one or more of the available access subnetworks over which the user data are communicated. The centralized communications management function can be served from a high-availability, high-performance server to provide reliable service that is always available.

While the system and method for centralized management are described in particular for the aviation domain (including, but not necessarily limited to, fixed wing, rotary wing, and unmanned aircraft), and specifically for Air/Ground (A/G) data communications, the system and method for centralized management can also be applied to other domains. For example, the system and method can be applicable to management of book-ended, over-the-air (e.g., wireless, satellite) mobile platform communications. The platform can be an aircraft, mobile device, ground vehicle, or the like. The communications can be for data, video (such as conferencing), or voice (e.g., Voice over Internet Protocol (VoIP)). The present system and method moves the complexity of the communications management function from the mobile platforms (e.g., aircraft, devices, vehicles, or the like) to the centralized server (e.g., ground-based server).

The centralized communications management function solves the problems noted above as follows. Each aircraft, (mobile) device, or vehicle platform will have a much smaller software/firmware client that utilizes less onboard processor resources. The impact to existing onboard applications and services will be reduced, and resources will not be taken away from existing and future onboard applications and services. In addition, the cost of safety and security certification in the development/implementation phase of the life cycle will be much less, as much of the complexity and size is pushed to the centralized server. The recovered non-recurring engineering (NRE) cost component of the price to the user will also be reduced. Also, the cost and logistical complexity for software/firmware updates and upgrades during the life cycle will be greatly reduced as most of the updates/upgrades are moved to the centralized server. The centralized server also will make it easier and less costly to improve the decision logic and add new features.

Other benefits of the centralized management approach include the following. The centralized communication management is an enabler for a new service that can be offered platform owners and operators on a subscription basis. The service is called Communications Management as a Service (CMaaS). The CMaaS can be provided and managed as a subscription-based service. In addition, the centralized communication management can use existing open-source protocols to implement the communications and management interactions between the server and the multiple clients. These protocols include open-source and standardized Authentication, Authorization and Accounting (AAA) protocols, such as Radius or Diameter (RFC 6733), which provides the authentication and authorization of clients. The Accounting protocol provides information for billing and subscription management as well as status exchange. The use of the Diameter protocol is recommended by ARINC 839. Other useful protocols include open-source and standardized security protocols, based on Internet Engineering Task Force (IETF) standards. In addition, PKI-based or shared secret keys and key management may be used, depending on the application domain.

Further, open-source and standardized media management functionality, such as standardized in IEEE 802.21 Media Independent Handover Services, may also be used in the centralized management approach. Note that ARINC 839 includes a subset of services standardized in IEEE 802.21. The centralized communications management function can also utilize more of the services standardized in IEEE 802.21. Open-source and standardized Internet Protocol (IP)-based communications protocols, including Transmission Control Protocol/Internet Protocol (TCP/IP) or User Datagram Protocol/Internet Protocol (UDP/IP), can also be used. A further benefit is that through the communications management operations, real-time information and operational data about the platform state, status, and usage can be provided for cloud-based data analytics, as a basis for other services or enhancements to existing services.

With respect to use in the commercial aviation application domain, the centralized communications management function can be implemented in a client-server architecture. For example, a chargeable service can be offered to manage the air/ground data communications that enable operational services in the airline information services domain. Example services include cabin, data, flight, maintenance, and like services; owner and operator operational services; third party maintenance provider services; and various other services.

The centralized communications management function selects the most cost-effective A/G datalinks during flight operations by using cost/policy-based decision logic to provide a centralized ground-based service that remotely manages and controls A/G data communications connectivity; and that supports multiple airline fleets, and/or multiple aircraft. The centralized communications management function uses real-time aircraft state data, onboard datalink status, and usage and dynamic application needs, to establish and maintain A/G connectivity for optimal cost-effective data transfer. This allows a thin client protocol to be used in each aircraft. A policy-enforcement point is provided on each aircraft to enable use of the selected datalinks.

The centralized communications management function also provides adaptive control over telemetry/event transfers with real-time data, which supports premium data analytics. A real-time event automatically, or through operator control, triggers a dynamic change in reservation of throughput or quality of service (QoS).

The centralized communications management function also provides easier, faster, and more cost-effective changes to airline policies (e.g., a new Service Level Agreement (SLA)) using ground-based reconfiguration; authenticates and authorizes user applications to utilize A/G data communication services; provides a media agnostic mechanism for applications to dynamically request changes in data communication services based on required QoS parameters and SLA; facilitates seamless handover between A/G access networks of different media technologies; and downlinks reports on aircraft state, connectivity information, and datalink usage to ground (accounting), which is an enabler for other services in connected aircraft or data analytics.

FIG. 1 is a schematic diagram illustrating a high-level operational view of a system 100 for centralized management of access subnetwork selections, in particular for commercial aviation applications, according to one implementation. The system 100 includes a centralized communications management function that is implemented in a client-server architecture.

As shown in FIG. 1, an IP-based communications management (ICM) client 110 is respectively located on each onboard server of multiple aircraft 112. The aircraft 112 can represent many aircraft of different airlines, for example. A single centralized ICM server 120 is located on the ground, such as in a ground data center. The ICM client 110 on each aircraft 112 can communicate with ICM server 120 through various subnetworks, such as satellite communications (SATCOM) 114, air-to-ground line-of-sight (LOS) radio communications 116 such as air-to-ground cellular, WiMAX and WiMAX-based technologies 118 such as an Aeronautical Mobile Airport Communication System (AeroMACS), WiFi/cell gatelink 119, and the like. These subnetworks are in operative communication with a ground network 130, which in turn communicates with ICM server 120.

The ICM server 120 is configured to provide CMaaS, and can interface to other services, such as flight support services 122, information services 123, airline operations 124, third party maintenance providers 126, as well as other services 128. The ICM server 120 is configured to provide useful information for the other services to use, and to enable control of A/G datalinks based on real-time needs of those other services.

Figure 2:
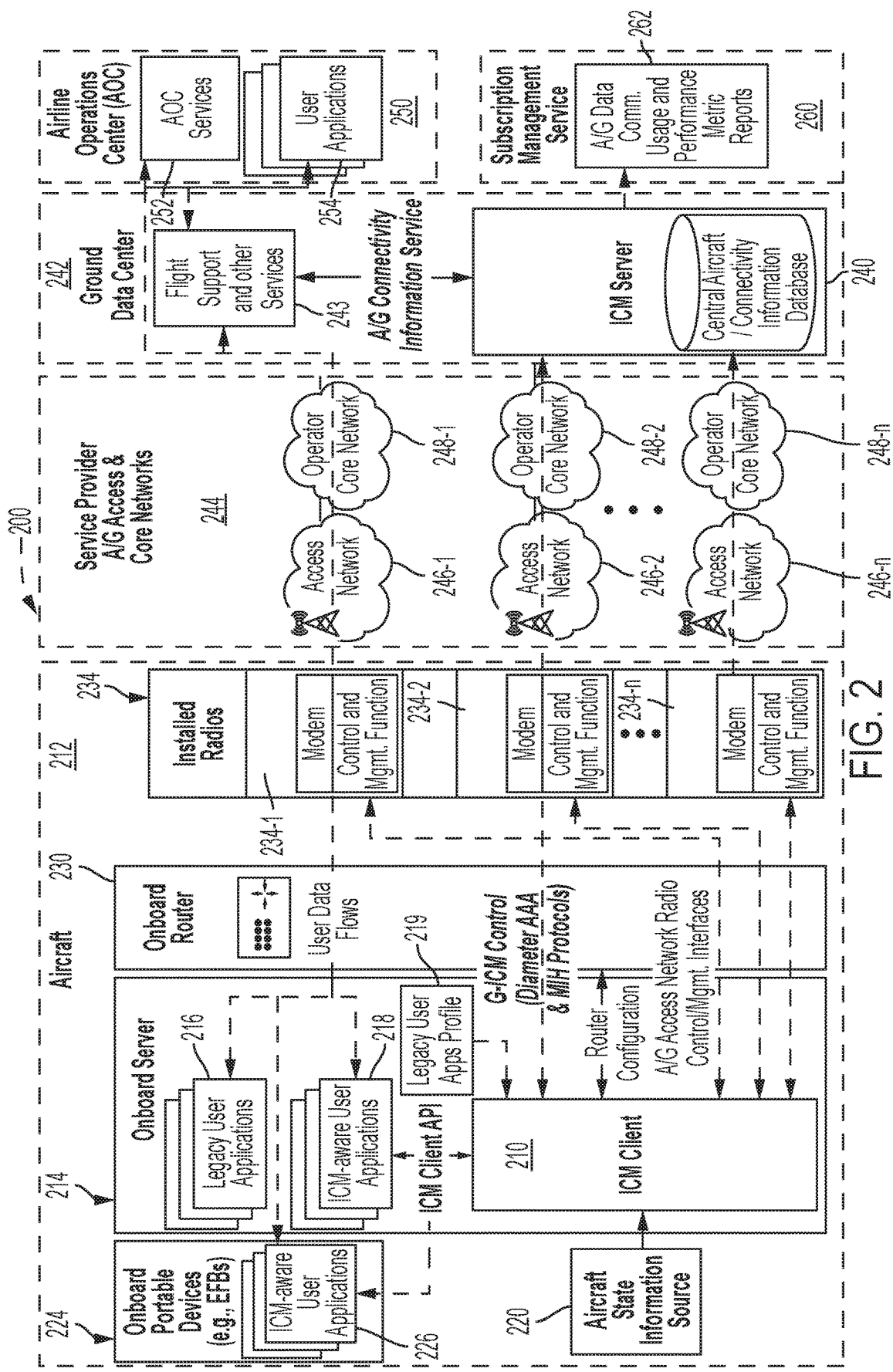
FIG. 2 is a block diagram of an architecture of a system for centralized management of access subnetwork selections, which can be implemented in the system of FIG. 1.

FIG. 2 is a block diagram illustrating an architecture of a system 200 for centralized management of access subnetwork selections, which can be implemented in system 100, for example. As depicted in FIG. 2, an ICM client 210 is located in each of one or more aircraft 212. The ICM client 210 is located on an onboard server 214, which also hosts one or more legacy user applications 216, and one or more ICM-aware user applications 218. The onboard server 214 also hosts an ICM client application programming interface (API), which provides communication between ICM client 210 and the other applications hosted by onboard server 214. A legacy user applications profile 219 also operatively communicates with ICM client 210.

An aircraft state information source 220 onboard aircraft 212 is operative to send data to ICM client 210. The aircraft 212 can also have one or more onboard portable devices 224, such as electronic flight bags (EFBs). The onboard portable devices 224 host one or more ICM-aware user applications 226, which are operative to communicate with ICM client 210 through the ICM client API.

The aircraft 212 also includes an onboard router 230, which provides communication and data flow pathways between onboard server 214 and a system of onboard installed radios 234, which can include a plurality of radios 234-1, 234-2, . . . 234-n. The installed radios 234 each include modems with control and management functions. A router configuration provides communication between ICM client 210 and router 230. Ground-ICM (G-ICM) control protocols (e.g., Diameter AAA and Media Independent Handover (MIH) protocols) provide the communication and management interactions for ICM client 210 with ground services. In addition, A/G access network radio control/management interfaces provide for the communication and management interactions of ICM client 210 with installed radios 234.

An ICM server 240 is located in a ground data center 242, and is configured to provide CMaaS, which in turn supports other provided services such as flight support services 243, and the like. In addition, ICM server 240 is configured to interface with an A/G connectivity information service to provide data analysis of a vehicle's data communications performance. The ICM client 210 on each aircraft 212 communicates with ICM server 240 through various subnetwork service providers 244, which provide various A/G access and core networks. For example, the subnetwork service providers 244 can provide an access network 246-1 that communicates with an operator core network 248-1, an access network 246-2 that communicates with an operator core network 248-2, and up to an access network 246-n that communicates with an operator core network 248-n.

An airline operations center (AOC) 250 is in operative communication ICM server 240. The AOC 250 is also in operative communication with onboard server 214 through one or more of subnetwork service providers 244. The AOC 250 provides AOC services 252 and hosts one or more user applications 254.

A subscription management service 260 is operative to receive data from ICM server 240. The subscription management service 260 is operative to generate A/G data communications usage and performance metric reports 262.

Figure 3A:
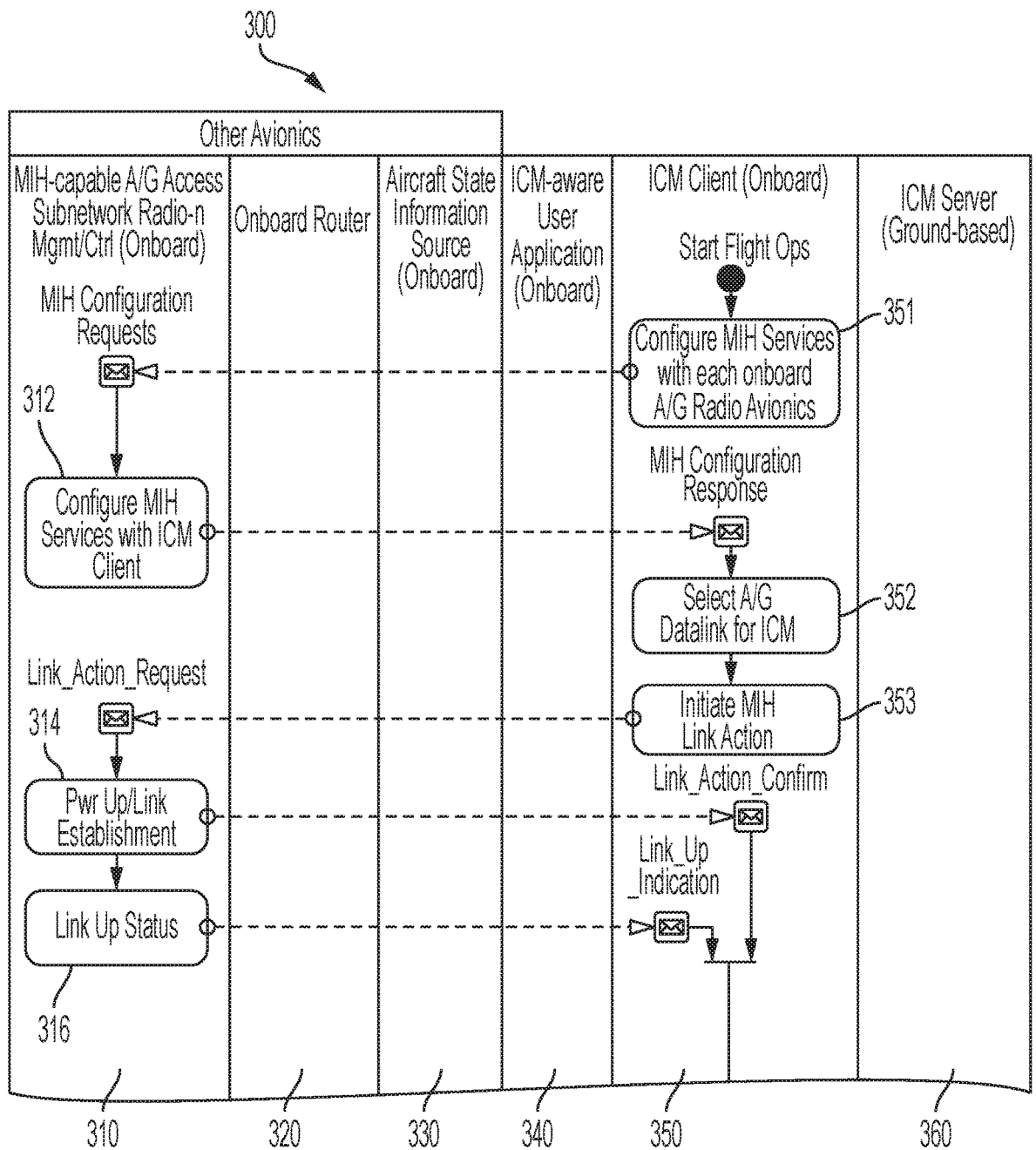
FIGS. 3A, 3B and 3C are activity flow diagrams of a method for establishing and managing communications using the system of FIG. 2.
Figure 3A:
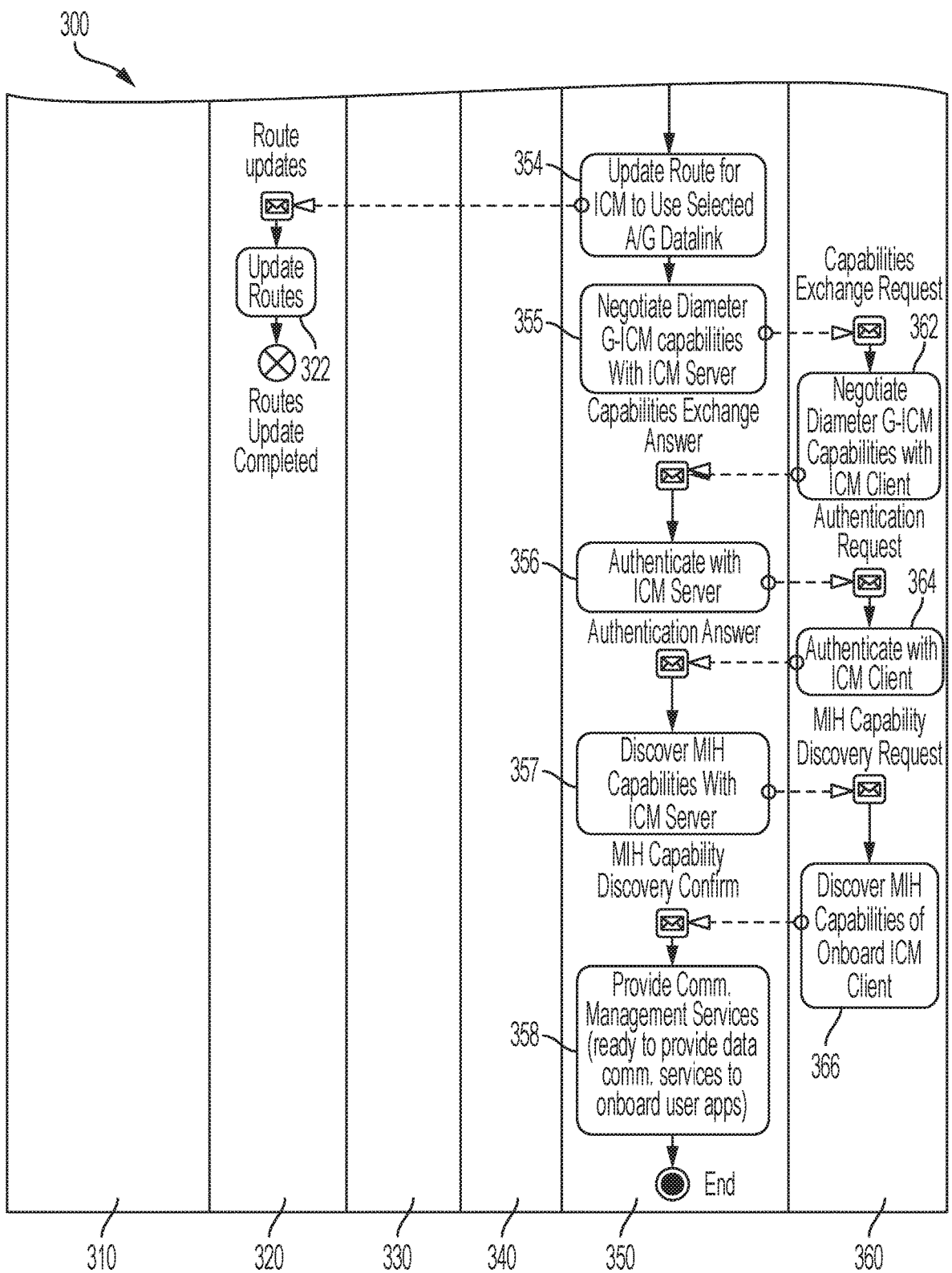
Figure 3B:
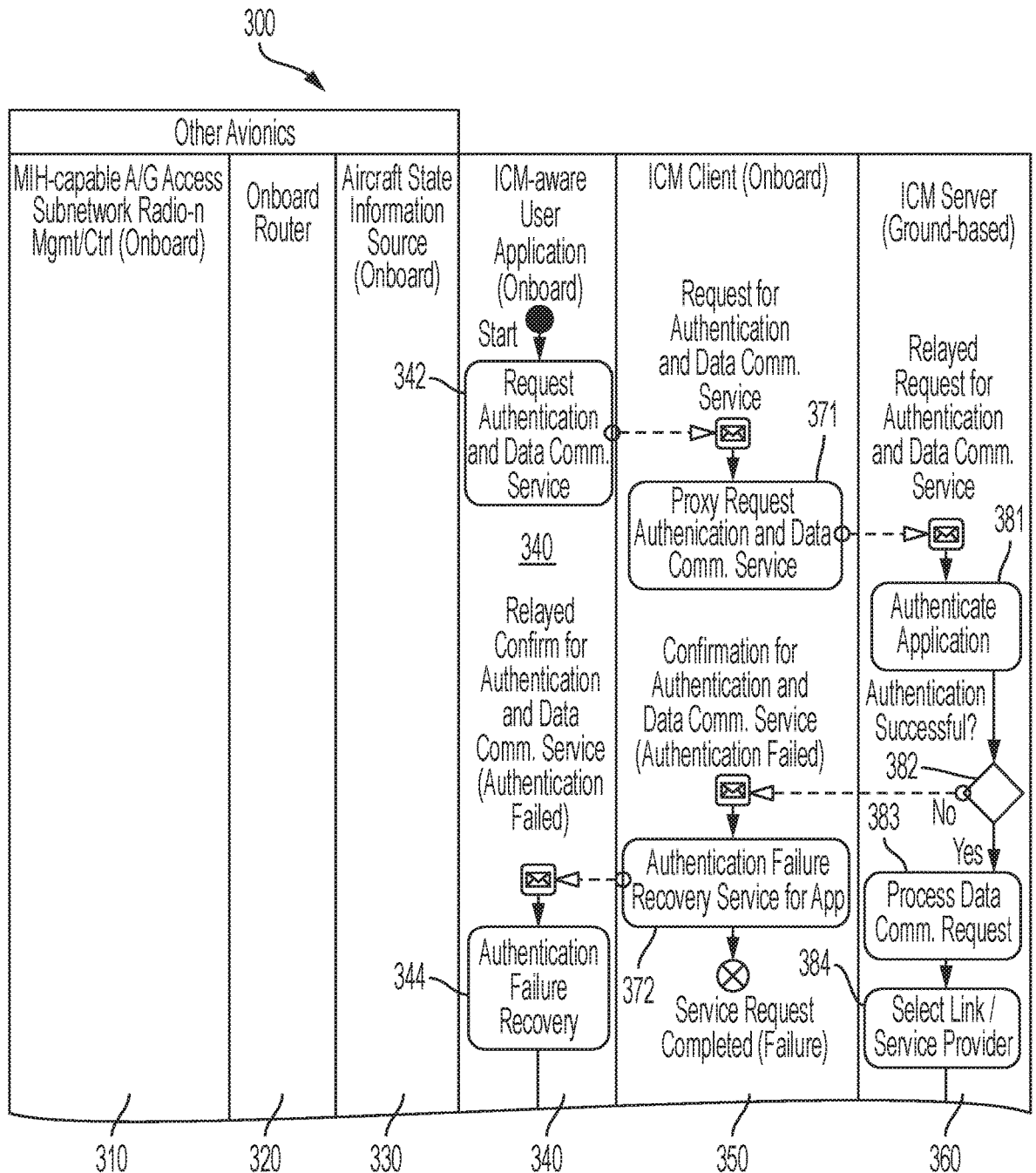
Figure 3B:
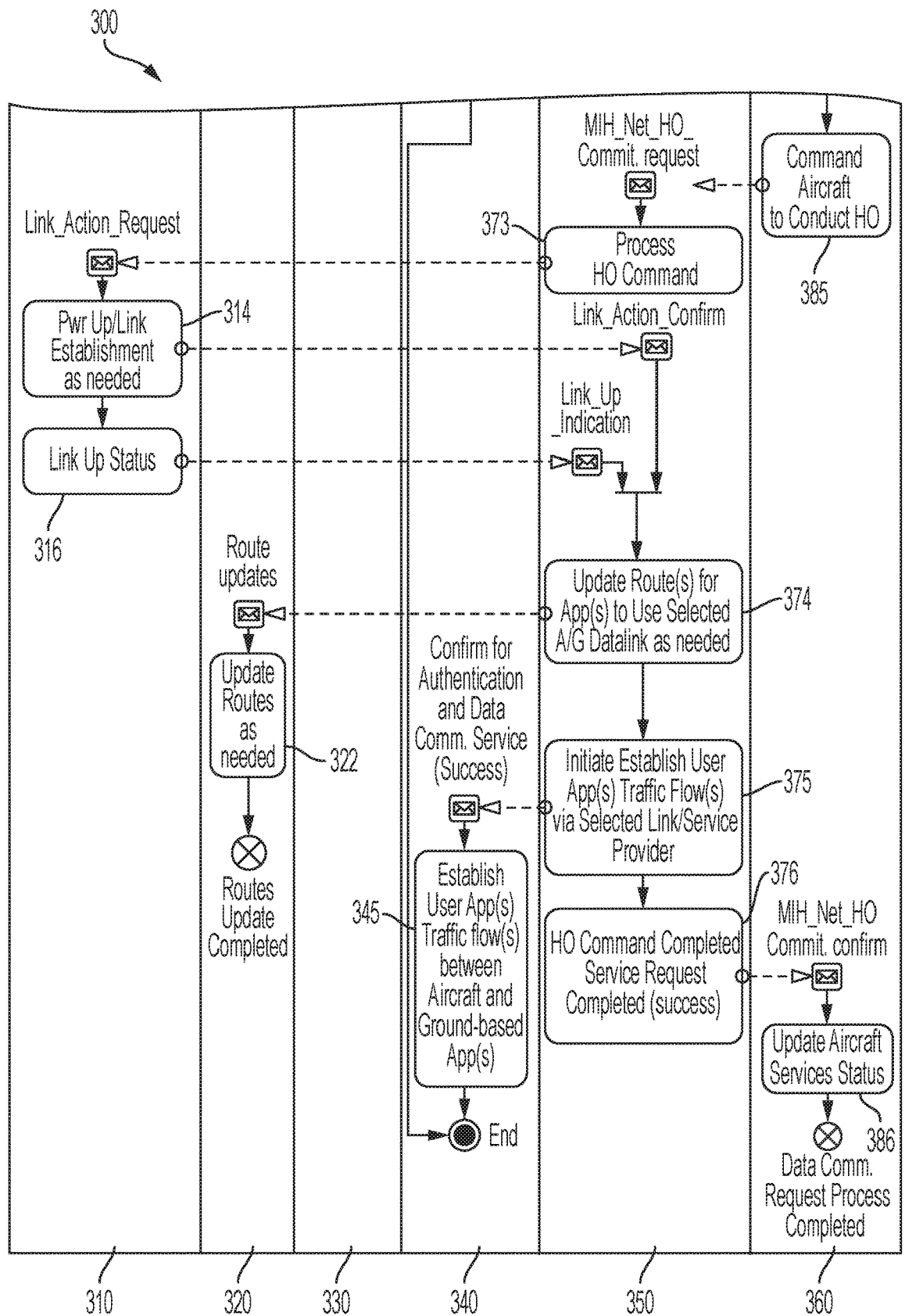
Figure 3C:
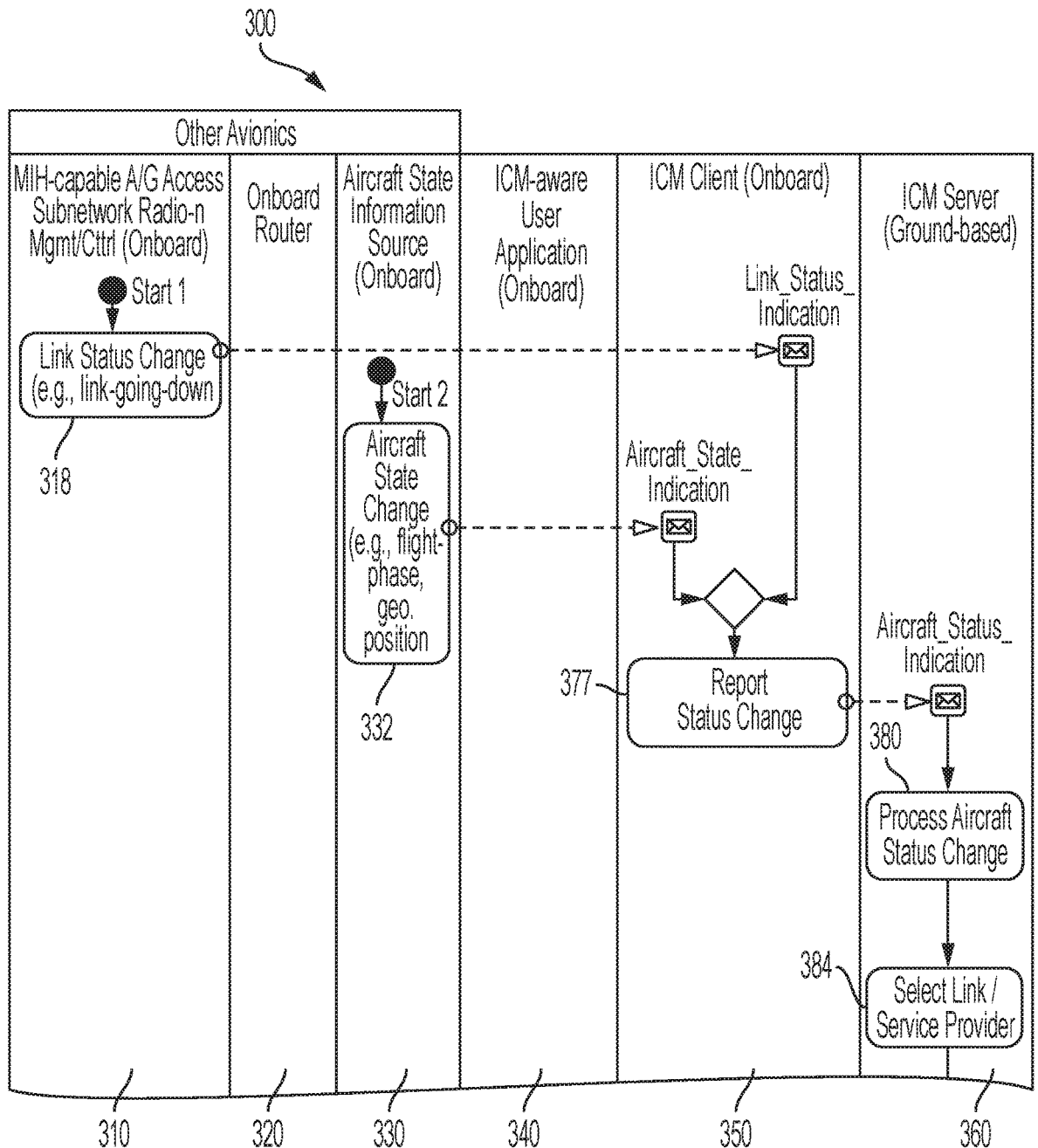
Figure 3C:
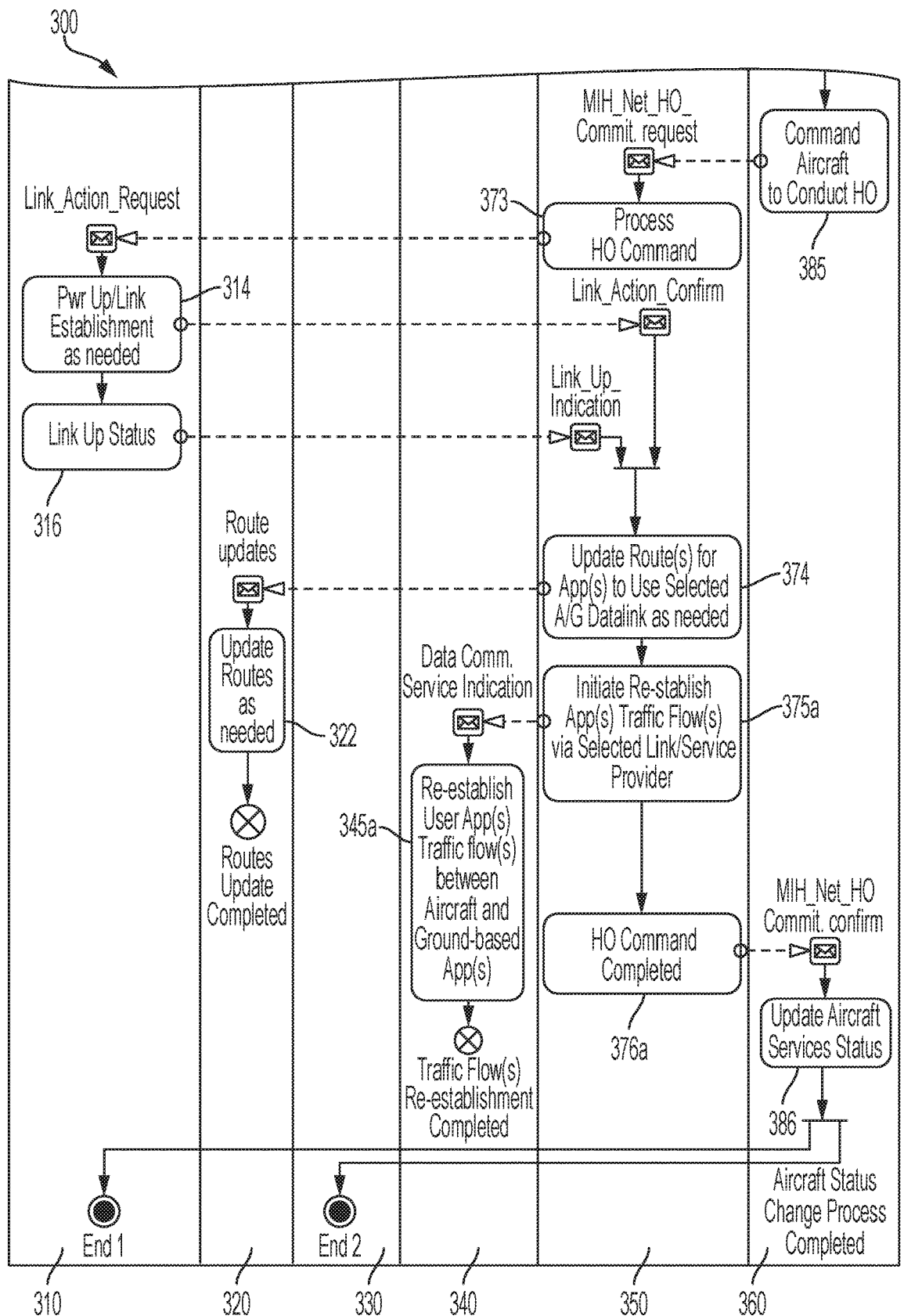

FIGS. 3A, 3B, and 3C are activity flow diagrams of a method 300 for establishing and managing ICM communications. FIG. 3A shows an initial startup of service with one aircraft. This is done prior to allowing onboard applications to join the service (i.e., request service—FIG. 3B) and then providing the service by managing datalinks for the applications. Each column, called a swim lane, represents a block shown in FIG. 2. The round-corner blocks in FIGS. 3A and 3B represent an action conducted. The activation of an action is either a solid-line arrow within a swim lane or a dashed-line arrow between swim lanes. The activations across swim lanes is achieved through exchanges of messages, which are represented by the "envelope" icon. Note that the term "MIH" in FIGS. 3A, 3B and 3C is "Media Independent Handover" and is based on IEEE 802.21 as described above.

As shown in FIGS. 3A, 3B and 3C, the first three columns represent other avionics onboard the aircraft, and include MIH-capable A/G access subnetwork radio management/control (lane 310), the onboard router (lane 320), and the aircraft state information source (lane 330). The next two columns represent the onboard ICM-aware user application (lane 340), followed by the onboard ICM client (lane 350). The last column represents the ground based ICM server (lane 360).

FIG. 3A depicts an activity flow diagram for an initial startup of service with one aircraft, according to an example implementation. At the start of flight operations (lane 350), the ICM client configures MIH services with each local A/G radio avionics (block 351). For each radio, the ICM client sends MIH configuration requests to each MIH-capable A/G access subnetwork radio-n management/control (lane 310), which then configures MIH services with the ICM client (block 312). A message is then sent back to the ICM client regarding MIH configuration responses (lane 350), and the ICM client selects the A/G datalink for ICM (block 352). The ICM client initiates an MIH link action (block 353), and sends a link action request to the MIH-capable A/G access subnetwork radio management/control (lane 310), which provides power up and link establishment (block 314) and sends a link action confirmation message back to the ICM client. A link up status is generated (block 316 in lane 310) and a link up indication message is sent to the ICM client (lane 350), which then provides an update route for the ICM to use the selected A/G datalink (block 354). The ICM client then sends a message regarding route updates to the onboard router (lane 320), which updates the routes (block 322), thereby completing the routes update.

The ICM client then negotiates diameter G-ICM capabilities with the ICM server (block 355) by sending a capabilities exchange request to the ICM server (lane 360). The ICM server negotiates diameter G-ICM capabilities with the ICM client (block 362) by sending a capabilities exchange answer to the ICM client. The ICM client then authenticates with the ICM server (block 356) by sending an authentication request to the ICM sever. The ICM server authenticates with the ICM client (block 364) by sending an authentication answer to the ICM client. Mutual authentication is thereby performed. The ICM client then discovers MIH capabilities with the ICM server (block 357) by sending an MIH capability discovery request to the ICM server. The ICM server discovers MIH capabilities of the ICM Client (block 366), and sends MIH capability discovery confirmation to the ICM client. The ICM client is then ready to provide communication management services (block 358), such as data communication services to onboard user applications.

After the process activities are completed per the activity flow diagram of FIG. 3A, an application can request service. This is illustrated by the activity flow diagram of FIG. 3B, according to an example implementation. The ICM-aware user application (lane 340) supports an interface with the ICM client (lane 350) to request service and receive status information about the service. In particular, when the ICM client and ICM-aware user application are ready, the ICM-aware user application generates a request for authentication and data communication services (block 342), and sends the request for authentication and data communication services to the ICM client (lane 350). The ICM client generates a proxy request for authentication and data communication services (block 371), and relays the request for authentication and data communication services to the ICM server (lane 360). The ICM server initiates an authentication of the requesting application (block 381), and determines whether the authentication was successful (block 382). If yes, the ICM server processes the data communication request (block 383), and selects the link and service provider based on the pre-arranged service level agreement (SLA), ICM client needs, and link service availability and status (block 384). If authentication fails (if no), the ICM server sends a confirmation for authentication and data communication service with indication of "authentication failed" to the ICM client (lane 350). The ICM client notifies the user application of the authentication failure by relaying the confirmation message to the user application (lane 340). The ICM client may conduct some recovery service for the user application (block 372), after which the service request is completed. The user application may also conduct some authentication failure recovery action (block 344).

Upon successful authentication of the application, the ICM server processes the data communication request, and selects the link and service provider based on the pre-arranged SLA, user application needs, and link service availability and status. The ICM server commands the aircraft to conduct a handover (HO) (block 385) by sending a MIH network HO commit request to the ICM client (lane 350), which processes the HO command (block 373). With an aircraft having multiple onboard A/G radios and the aircraft owner having pre-arranged SLA's with one or more communication service providers, the ICM client, based on the HO command from the ICM server, may use an already established link, establish a new link, or initiate a handover from an old link to a new link. Thus, the communications as a service supports use of multiple links and communication service providers such that the onboard user applications, and the ICM client itself, can utilize the same or different links, and multiple links in parallel. At this point, as before, the ICM client initiates an MIH link action (block 353, FIG. 3A), and sends a link action request to the selected MIH-capable A/G access subnetwork radio management/control (lane 310), which provides power up and link establishment as needed (block 314), as shown in FIG. 3B. A link action confirmation message is then sent back to the ICM client. A link up status is generated (block 316 in lane 310) and sends a link up indication message to the ICM client. The ICM client then provides an update route(s) for a user application(s) to use the selected A/G datalink as needed (block 374). The ICM client sends a message regarding route updates to the onboard router (lane 320), which updates the routes as needed (block 322), and the routes update is completed.

The ICM client then initiates and establishes user application(s) traffic flow(s) via the selected link/service provider (block 375). The ICM client notifies the user application by sending a confirmation for authentication and data communication service (lane 340), indicating success and any upper layer connectivity information needed by the user application. The user application then establishes traffic flow between the aircraft and a ground-based application(s) (block 345).

Not explicitly shown in FIG. 3B is a handover operation. If the HO command from the ICM server requires a handover from an old existing link to a new link, the ICM client would use the link action request to power up radio/establish new link (as needed) and terminate old link/power down radio (as needed), along with new link up indications and old link down indications, to conduct the link layer handover. The ICM client would coordinate the link layer handover with the upper layer handover to maintain A/G connectivity from one A/G link to another A/G link.

Once HO command processing is completed, and a service request is successfully completed (block 376), the ICM client sends an MIH network HO commit confirm message to the ICM server (lane 360). The ICM server updates a status of the aircraft in its services status database (block 386), to maintain current information about communication services, after which the data communication request process is completed.

The activity flow diagram of FIG. 3C is similar to the activity flow diagram of FIG. 3B, except the initiating condition is an aircraft status change instead of a data communication request from a user application. Two examples of aircraft status changes are provided in FIG. 3C. Start 1 (lane 310) is a link status change (e.g., link-going-down) (block 318), from which a link status indication is sent to the ICM client (lane 350). Start 2 (lane 330) is an aircraft state change (e.g., flight-phase change or crossing a geographical boundary) (block 332), from which an aircraft state indication is sent to the ICM client. The ICM client then generates an aircraft status change report (block 377), and sends an aircraft status indication to the ICM server (lane 360). The ICM server processes the aircraft status change (block 380), which may result in selecting a different link and service provider (block 384). The ICM server commands the aircraft to conduct HO (block 385), and the activity continues in the same manner for the two examples, using steps similar to those used for the data communication request from a user application (see FIG. 3B).

For instance, as shown in FIG. 3C, the ICM server commands the aircraft to conduct a HO by sending a MIH network HO commit request to the ICM client, which processes the HO command (block 373). At this point, the ICM client sends a link action request to the selected MIH-capable A/G access subnetwork radio management/control (lane 310), which provides power up and link establishment as needed (block 314). A link action confirmation message is then sent back to the ICM client. A link up status is generated (block 316 in lane 310) and a link up indication message is sent to the ICM client. The ICM client then provides an update route(s) for a user application(s) to use the selected A/G datalink as needed (block 374). The ICM client sends a message regarding route updates to the onboard router (lane 320), which updates the routes as needed (block 322), and the routes update is completed.

The ICM client then initiates and re-establishes user application traffic flow via the selected link/service provider (block 375*a*). The ICM client notifies the user application by sending a data communication service indication. The user application then re-establishes traffic flow between the aircraft and a ground-based application (block 345*a*). This completes the traffic flow re-establishment. Once HO command processing is completed (block 376*a*), the ICM client sends an MIH network HO commit confirm message to the ICM server (lane 360). The ICM server updates a status of the aircraft in its services status database (block 386), after which the aircraft status change process is completed for the two examples.

As described above, the ICM-aware user application supports an interface with the ICM client to request service and receive status information about the service. A legacy user application represents one application that does not support this interface. An onboard policy database helps the ICM client to act as proxy for the legacy user applications, to initiate and manage the service specified in the onboard policy database. Support of legacy user applications is not an ideal situation, but airlines have existing applications that they would not want to pay to have modified to support this interface.

As described above, an application must be authenticated and authorized before using this service. Authentication and security of A/G communications, whether user data communications or G-ICM control communications, can use standardized security mechanisms and algorithms, such as PKI-based security (public key infrastructure using public-private keys) or shared private key security.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for centralized management of access subnetwork selections, the system comprising: an Internet protocol-based communications management (ICM) client located on an onboard server of each of one or more vehicles; and an ICM server located at a ground center, the ICM server in operative communication with the ICM client on each of the one or more vehicles; wherein the ICM client on each of the one or more vehicles is operative to communicate with the ICM server through one or more subnetworks, which are in operative communication with a ground network, wherein the ground network communicates with the ICM server.

Example 2 includes the system of Example 1, wherein the one or more vehicles comprises one or more aircraft.

Example 3 includes the system of any of Examples 1-2, wherein the one or more subnetworks comprise satellite communications (SATCOM), air-to-ground line-of-sight (LOS) radio communications, WiMAX/WiMAX-based technologies, or WiFi/cell gatelink.

Example 4 includes the system of Example 3, wherein: the air-to-ground LOS radio communications include air-to-ground cellular; and the WiMAX/WiMAX-based technologies include an aeronautical mobile airport communication system (AeroMACS).

Example 5 includes the system of any of Examples 1-4, wherein the ICM server is configured to provide communications management as a service.

Example 6 includes the system of any of Examples 1-5, wherein the ICM server is configured to interface with an air-to-ground connectivity information service to provide data analysis of a vehicle's data communications performance.

Example 7 includes the system of any of Examples 1-6, wherein the ICM server is configured to interface with one or more services comprising flight support services, information services, airline operations, or third party maintenance providers.

Example 8 includes the system of any of Examples 1-7, wherein the onboard server hosts an ICM client application programming interface (API), which provides communication between the ICM client and other applications hosted by the onboard server.

Example 9 includes the system of any of Examples 1-8, wherein the onboard server hosts one or more ICM-aware user applications.

Example 10 includes the system of any of Examples 1-9, wherein the onboard server hosts one or more legacy user applications, and a legacy user applications profile that operatively communicates with the ICM client.

Example 11 includes the system of any of Examples 8-10, wherein one or more onboard portable devices each host one or more ICM-aware user applications, which are operative to communicate with the ICM client through the ICM client API.

Example 12 includes the system of Example 11, wherein the one or more onboard portable devices comprise one or more electronic flight bags.

Example 13 includes the system of any of Examples 1-12, further comprising an onboard state information source that is operative to send data to the ICM client.

Example 14 includes the system of any of Examples 1-13, further comprising an onboard router configured to provide communication and data flow pathways between the onboard server and one or more onboard radios, wherein the one or more onboard radios each include control and management functions.

Example 15 includes a method for centralized management of access subnetwork selections, the method comprising: providing an Internet protocol-based communications management (ICM) client on an onboard server of each of one or more mobile platforms; providing a centralized ICM server, which is in operative communication with the ICM client on each of the one or mobile platforms; and sending one or more data transmissions, between the ICM client on one or more of the mobile platforms and the ICM server, through one or more subnetworks, which are in operative communication with a ground network, wherein the ground network communicates with the ICM server.

Example 16 includes the method of Example 15, wherein the ICM server is configured to authenticate an application requesting a service.

Example 17 includes the method of any of Examples 15-16, wherein one or more onboard ICM-aware user applications support an interface with the ICM client to request a service and receive status information about the service.

Example 18 includes the method of any of Examples 15-17, wherein the ICM server includes an onboard policy database to aid the ICM client to act as proxy for a legacy user application, to initiate and manage a service specified in the onboard policy database.

Example 19 includes the method of any of Examples 15-18, wherein the ICM server is configured to provide subscription-based communications management as a service.

Example 20 includes the method of any of Examples 15-19, wherein the ICM server is configured to interface with one or more services comprising flight support services, information services, airline operations, or third party maintenance providers.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for centralized management of access subnetwork selections, the system comprising:
    an Internet protocol-based communications management (ICM) client located on an onboard server of each of one or more vehicles; and
    an ICM server located at a ground center, the ICM server in operative communication with the ICM client on each of the one or more vehicles;
    wherein the ICM client on each of the one or more vehicles is operative to communicate with the ICM server through one or more subnetworks, which are in operative communication with a ground network, wherein the ground network communicates with the ICM server;
    wherein the ICM server is configured to provide centralized communications management that remotely manages and controls air/ground data communications connectivity and subnetwork selections;
    wherein the ICM client is configured to authenticate with the ICM server by sending an authentication request to the ICM sever, and the ICM server is configured to authenticate with the ICM client by sending an authentication answer to the ICM client, such that mutual authentication is performed;
    wherein the ICM client is configured to discover media independent handover (MIH) capabilities with the ICM server by sending an MIH capability discovery request to the ICM server, wherein the ICM server is configured to discover the MIH capabilities of the ICM client and send a MIH capability discovery confirmation to the ICM client;
    wherein the ICM server is configured to receive a request for authentication and data communication services from an onboard application via a proxy request from the ICM client, and to initiate authentication of the onboard application;
    wherein upon a successful authentication of the onboard application, the ICM server is configured to process the request for data communication services by selecting an air/ground datalink and service provider, and to send a MIH network handover request to the ICM client for processing;
    wherein the ICM server is configured to provide the centralized communications management as a service for access subnetwork selections.

2. The system of claim 1, wherein the one or more vehicles comprises one or more aircraft.

3. The system of claim 1, wherein the one or more subnetworks comprise satellite communications (SATCOM), air-to-ground line-of-sight (LOS) radio communications, WiMAX/WiMAX-based technologies, or WiFi/cell gatelink.

4. The system of claim 3, wherein:
    the air-to-ground LOS radio communications include air-to-ground cellular; and
    the WiMAX/WiMAX-based technologies include an aeronautical mobile airport communication system (AeroMACS).

5. The system of claim 1, wherein the ICM server is configured to provide the communications management as a service by interfacing with a subscription management service that is operative to receive data from the ICM server.

6. The system of claim 1, wherein the ICM server is configured to interface with an air-to-ground connectivity information service to provide data analysis of a vehicle's data communications performance.

7. The system of claim 1, wherein the ICM server is configured to interface with one or more services comprising flight support services, information services, airline operations, or third party maintenance providers.

8. The system of claim 1, wherein the onboard server hosts an ICM client application programming interface (API), which provides communication between the ICM client and other applications hosted by the onboard server.

9. The system of claim 1, wherein the onboard server hosts one or more ICM-aware user applications.

10. The system of claim 9, wherein the onboard server hosts one or more legacy user applications, and a legacy user applications profile that operatively communicates with the ICM client.

11. The system of claim 8, wherein one or more onboard portable devices each host one or more ICM-aware user applications, which are operative to communicate with the ICM client through the ICM client API.

12. The system of claim 11, wherein the one or more onboard portable devices comprise one or more electronic flight bags.

13. The system of claim 1, further comprising an onboard state information source that is operative to send data to the ICM client.

14. The system of claim 1, further comprising an onboard router configured to provide communication and data flow pathways between the onboard server and one or more onboard radios, wherein the one or more onboard radios each include control and management functions.

15. A method for centralized management of access subnetwork selections, the method comprising:
   providing an Internet protocol-based communications management (ICM) client on an onboard server of each of one or more mobile platforms comprising one or more aircraft;
   providing a centralized ICM server, which is in operative communication with the ICM client on each of the one or mobile platforms; and
   sending one or more data transmissions, between the ICM client on one or more of the mobile platforms and the ICM server, through one or more subnetworks, which are in operative communication with a ground network, wherein the ground network communicates with the ICM server;
   wherein the ICM server provides centralized communications management that remotely manages and controls air/ground data communications connectivity and subnetwork selections;
   wherein the ICM client authenticates with the ICM server by sending an authentication request to the ICM sever, and the ICM server authenticates with the ICM client by sending an authentication answer to the ICM client, such that mutual authentication is performed;
   wherein the ICM client discovers media independent handover (MIH) capabilities with the ICM server by sending an MIH capability discovery request to the ICM server, wherein the ICM server discovers the MIH capabilities of the ICM client and sends a MIH capability discovery confirmation to the ICM client;
   wherein the ICM server receives a request for authentication and data communication services from an onboard application via a proxy request from the ICM client, and initiates authentication of the onboard application;
   wherein upon a successful authentication of the onboard application, the ICM server processes the request for data communication services by selecting an air/ground datalink and service provider, and sends a MIH network handover request to the ICM client for processing.

16. The method of claim 15, wherein the ICM server is configured to authenticate an application requesting a service.

17. The method of claim 15, wherein one or more onboard ICM-aware user applications support an interface with the ICM client to request a service and receive status information about the service.

18. The method of claim 15, wherein the ICM server includes an onboard policy database to aid the ICM client to act as proxy for a legacy user application, to initiate and manage a service specified in the onboard policy database.

19. The method of claim 15, wherein the ICM server is configured to provide subscription-based communications management as a service.

20. The method of claim 15, wherein the ICM server is configured to interface with one or more services comprising flight support services, information services, airline operations, or third party maintenance providers.

* * * * *